March 16, 1926.  1,576,607
W. S. HASSKARL
DOMESTIC SINK CABINET
Filed Nov. 21, 1925  2 Sheets-Sheet 2
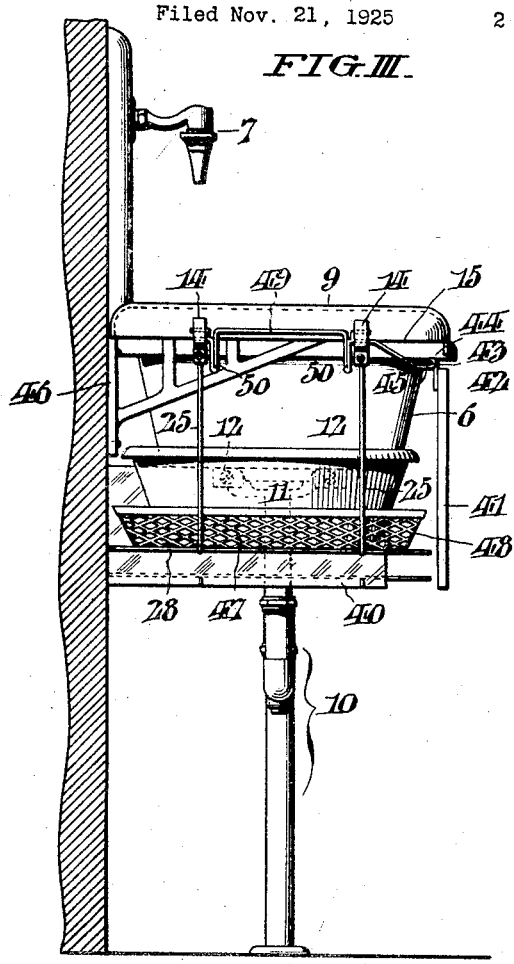
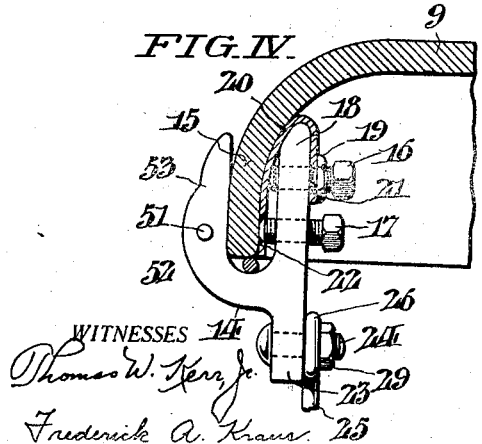
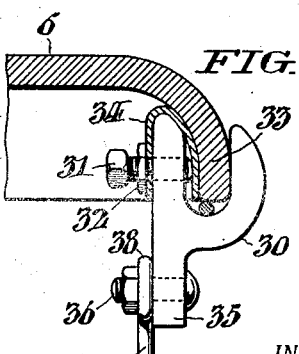
WITNESSES
INVENTOR:
William S. Hasskarl
BY
ATTORNEYS.

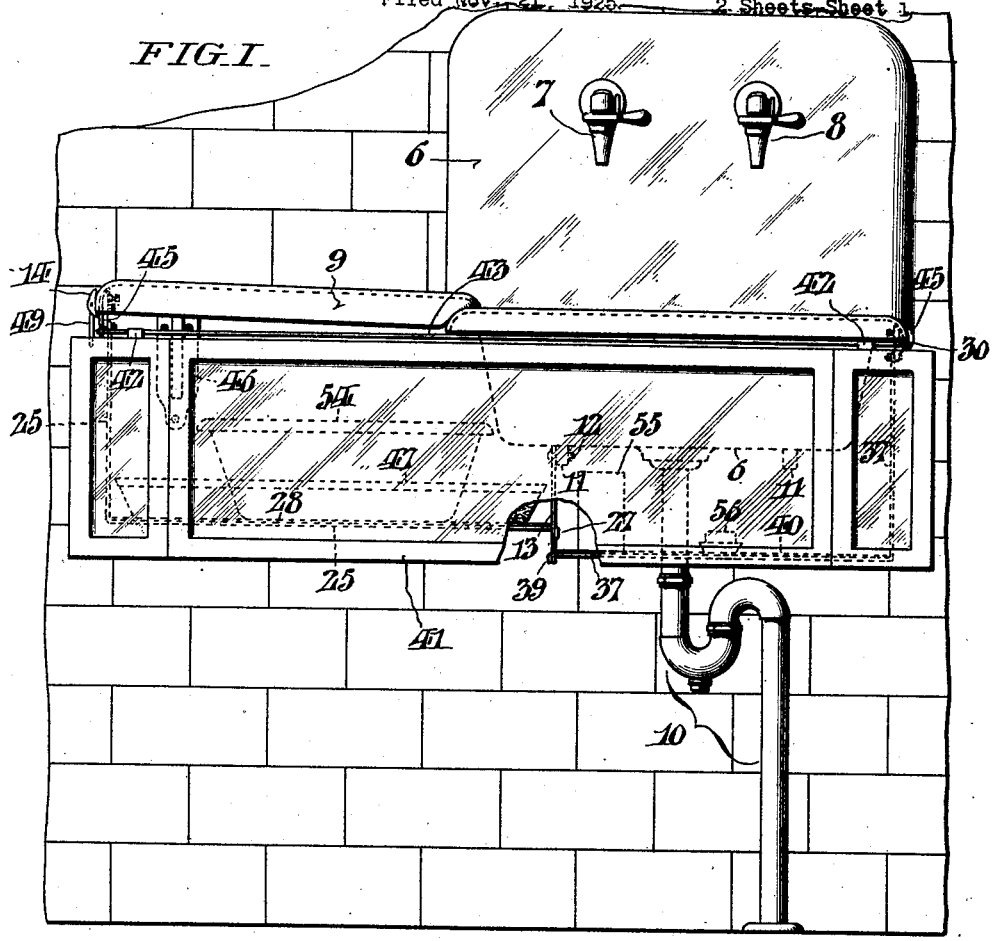
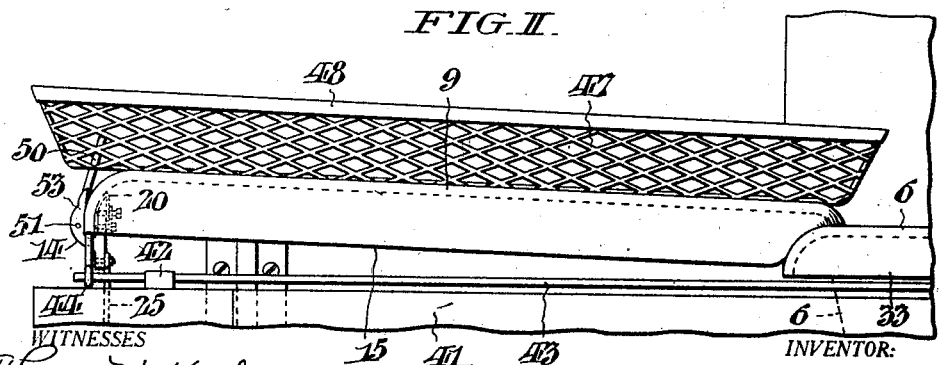

Patented Mar. 16, 1926.

1,576,607

UNITED STATES PATENT OFFICE.

WILLIAM S. HASSKARL, OF PHILADELPHIA, PENNSYLVANIA.

DOMESTIC SINK CABINET.

Application filed November 21, 1925. Serial No. 70,503.

*To all whom it may concern:*

Be it known that I, WILLIAM S. HASSKARL, a citizen of the United States, residing at Philadelphia, county of Philadelphia, and State of Pennsylvania, have invented certain new and useful Improvements in Domestic Sink Cabinets, of which the following is a specification, reference being had to the accompanying drawings.

This invention relates to domestic sink cabinets and it has for its primary object the provision of an adjunctive means for attachment to kitchen sinks whereby the latter are afforded sub-storage capacity for the customary sink accessories such as dish pans, cleansing medium, cloths and so forth.

Another object of this invention is the provision of a utility of the foregoing typified character which compactly shrouds the subjacent fittings of a kitchen sink and associated draining slab with provision of screened underlying shelving.

A further object of the present invention is to provide a kitchen sink cabinet having an associated novel form of draining pan connectible upon the ordinary draining slab; and, which, when not in use is stored in the cabinet aforesaid.

A still further object of this invention is to provide a compact, durable and economical kitchen sink cabinet which can be easily installed without damage to the enamelled or finished surfaces of standard sinks.

With the foregoing and other objects in view, as will be apparent from the following description, this invention consists in certain structural features, combinations and aggroupment of parts hereinafter set forth; while the appended claims serve to tersely define its character and scope.

Reference is to be had to the accompanying drawings, forming a part of this specification and illustrating one practical embodiment of the invention, corresponding parts in all the views being designated by like reference numerals.

Fig. I, is a front view of a conventional kitchen sink having my novel cabinet attachment applied thereto.

Fig. II, is a somewhat enlarged front elevation of the sink draining-slab with my novel draining pan in applied position.

Fig. III, is an end elevation looking towards the right hand of Fig. I.

Fig. IV, is an enlarged detail view of a supporting clamp member hereinafter fully described; and, Fig. V, is a similar view of a slightly different form of the clamp member.

Referring more in detail to the drawings, an ordinary kitchen sink is comprehensively designated by the numeral 6, the same having conventional hot and cold water spigots 7, 8 respectively, as well as a draining slab 9 at the left-hand side thereof for example; while the numeral 10 indicates the customary drain connection, said parts being referred to solely by way of clarifying my invention.

A kitchen sink 6 of the type illustrated is invariably provided at the underside with apertured lugs 11 for the connection of bracing supports if necessary, but I make use of them for another purpose:—to wit, the attachment thereto, by means of bolts or the like 12, of a partition 13, conveniently—though not essentially—made of galvanized or enamled sheet metal for sanitary purposes.

Two or more spaced forked or clamp members 14, best shown in Fig. IV, are attached to the outer end roll flange 15 of the draining slab 9 by means of screws 16, 17 threaded through the inner limb 18 of said member, while the former screw is provided with a jamb nut 19 for a purpose later on explained. A soft metal liner strip 20 is interposed between the drain slab flange 15 and the clamp limb 18, and it is apertured at 21, 22 for passage of the screws 16, 17, respectively. Attention is particularly directed to the fact that the liner strip 20 is retroverted intermediate the ends to snugly lie over the upper end of the limb 18, while the upper screw 16 passes through the hole 21 with its inner end abutting said liner strip, the jamb nut 19 locking said screw at the requisite adjustment to firmly attach the clamp member 14 in place. On the other hand the screw 17 is simply threaded into the limb 18 with its inner end engaged in the hole 22 sufficiently to prevent lateral movement of the liner strip 20 while not too forcibly impinging the inner surface of the draining slab flange 15.

Removably attached to the apertured limb 23 of each clamp member 14, through the medium of a bolt 24, is an angled suspension rod 25, having an eye 26 at one end through which said bolt is passed while the other end is conveniently bent or hooked at 27 for engagement in an aperture—provided for the purpose—in the partition aforesaid. The suspension rods 25 serve as support for a shelf 28, and it will be readily understood that by tightening the nuts 29 of the bolts 24 said rods and shelf are stationarily retained in position. Obviously the suspension rod ends 27 may be screw threaded to receive jamb nuts, placed one at each side of the partition 13, in a manner well understood without further explanation herein.

Similarly, forked clamp members 30—Fig. V—are attached by screws 31, having jamb nuts 32, to the roll flange 33 of the sink 6, with interposition of soft metal liner strips 34, as above described. These clamp members 30, are, however, relatively shorter than the clamp members 14 and not provided with the additional screws 17. Removably attached to the apertured end 35 of each clamp member 30, by means of a bolt 36, is an angled suspension rod 37 having an eye 38 at one end and a hook part 39 at the other for similar purposes to those set forth in connection with the rods 25; and these rods serve to support a second shelf 40—conveniently though not essentially—at a lower level than the shelf 28, aforesaid.

A removable fall-down door 41 provided with hook-on hinge straps 42 is supported in front of the shelves 25, 40, by means of a transverse rod 43 engaged in the eyed ends 44 of bearer members 45 conveniently held in place by the clamp devices 14, 30, as will be readily understood on an examination of the drawings. The door 41, is appropriately of light structure and given a panel finish, as indicated in Fig. I, to give added attractiveness; while, it will be apparent, the same provides a neat frontal closure whereby the unsightly accessories of the sink can be conveniently stored with provision of ready accessability. Incidentally, the draining slab 9 is supported at one end upon the sink flange 33 and adjacent the other end by a conventional bracket 46.

In conjunction with the sink cabinet above described and as an adjunct thereof I provide an expanded metal draining pan 47 having its upper peripheral edges protected by a U-section bead 48 clamped thereabout, and said pan is serviceable to effectively drain washed articles over the slab 9 without cluttering the latter with slop. In order that the draining pan 47 may rest upon the slab 9 without any slipping tendency I make use of a locking bail 49—conveniently fabricated from a single length of suitable gauge wire—retroverted adjacent its ends to provide prongs 50 and pintles 51, by means of which it is freely journaled in holes 52 provided for the purpose in the outer limbs 53 of the hereinbefore described clamp members 14. When the draining pan 47 is located for use, as shown in Fig. II, it will be observed the bail 49 is upwardly swung with the prongs projected through spaced apertures in the expanded metal base of said pan. On the other hand, when the draining pan 47 is stored on the shelf 28, or out of use, the bail 49 is downwardly turned, as shown most clearly in Fig. III, between the clamp members 14 so as not to project above the level of the draining slab 9 when the pan 47 is not required.

An ordinary dish pan, cleanser container, and soap dish are conventionally indicated in dotted outline by the respective indicia 54, 55 and 56, in Fig. I, to better illustrate the storage convenience of my novel kitchen sink cabinet, while it will be obvious other accessories may be similarly stored therein on the underlying shelving 28, 40.

From the foregoing, it is thought the usefulness and advantages of my domestic sink cabinet will be self-evident without further explanation herein. Furthermore it is to be expressly understood that I do not limit myself to the application of my invention to kitchen sinks alone, neither are the structural details restricted to those specifically illustrated, as changes therein will readily suggest themselves without departing from the scope of said invention as defined by the subjoined claims.

Having thus described my invention, I claim:

1. The combination with a domestic sink and draining slab of removable suspended rods adapted to sustain shelving which affords underlying storage for sink accessories.

2. The combination with a domestic sink and draining slab of pendent members adapted to sustain shelving which affords underlying storage for sink accessories, said members being removably clamped to the sink and slab flanges.

3. The combination with a domestic sink and draining slab of pendent members adapted to sustain shelving which affords underlying storage for sink accessories, said members being removably clamped to the sink and slab flanges, and a fall-down door hinged in front of the shelving.

4. The combination with a domestic sink and draining slab of pendent members adapted to sustain shelving which affords underlying storage for sink accessories, a partition secured below the sink, the aforesaid pendent members being removably clamped to the sink and slab flanges with their inner ends engaged in the partition, and a fall-down door hinged in front of the shelving.

5. The combination with a domestic sink and draining slab, of a partition secured below the sink, opposedly directed angle rods connected at their outer ends to forked members adapted for clamping upon the sink and slab flanges, the inner ends of said rods being engaged through apertures in the partition, shelving sustained by the angle rods, and a fall-down door hinged in front of the shelving.

6. The combination with a domestic sink and draining slab, of a partition secured below the sink, opposedly directed angle rods connected at their outer ends to forked members for clamping upon the sink and slab flanges with inter-position of protective liner strips, the inner ends of said rods being downwardly hooked for engagement through apertures in the partition, shelving seated on the angle members, and a fall-down door closing in the front of the shelving.

7. The combination with a domestic sink and draining slab of a partition secured below the sink, opposedly directed angle rods connected at their outer ends to forked members adapted for clamping engagement upon the sink and slab flanges with inter-position of protective liner strips, and each of the forked members having one limb provided with one or more set-screws for stabilizing retention of the liner strip.

8. The combination with a domestic sink and draining slab of a partition secured below the sink, opposedly directed angle rods connected at their outer ends to forked members adapted for clamping engagement upon the sink and slab flanges with inter-position of protective liner strips, the inner ends of said rods being downwardly hooked for engagement through apertures in the partition, shelving seated on the angle rods, a fall-down door closing in the front of the shelving, and a bail journaled between a pair of the aforesaid forked members for the purpose hereinbefore set forth.

9. The combination with a domestic sink and draining slab, of a partition removably attached below the sink, opposedly directed angle rods connected at their outer ends to forked members adapted for clamping engagement upon the sink and slab flanges with inter-position of protective liner strips, each of the forked members having one limb fitted with one or more set-screws for stabilizing retention of the liner strip, shelving on the angle rods, frontal closing means, and a retaining bail freely journaled between the forked members of the draining slab aforesaid having prongs for the purpose hereinbefore set forth.

In testimony whereof, I have hereunto signed my name at Philadelphia, Pennsylvania, this 18th day of November 1925.

WILLIAM S. HASSKARL.